(12) United States Patent
Lombardo et al.

(10) Patent No.: US 9,631,872 B2
(45) Date of Patent: Apr. 25, 2017

(54) MULTI-CIRCUITED VEHICULAR THERMAL MANAGEMENT SYSTEM AND METHOD

(71) Applicant: GM GLOBAL TECHNOLOGY OPERATIONS LLC, Detroit, MI (US)

(72) Inventors: Paul S. Lombardo, Commerce Township, MI (US); Lawrence P. Ziehr, Clarkston, MI (US); Bryan M. Styles, South Lyon, MI (US); Mark D. Nemesh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1075 days.

(21) Appl. No.: 13/757,989

(22) Filed: Feb. 4, 2013

(65) Prior Publication Data

US 2014/0216689 A1    Aug. 7, 2014

(51) Int. Cl.
*F28F 27/00* (2006.01)
*F28D 7/00* (2006.01)
*B60H 1/00* (2006.01)
*B60H 1/14* (2006.01)

(52) U.S. Cl.
CPC ....... *F28D 7/0008* (2013.01); *B60H 1/00385* (2013.01); *B60H 1/00492* (2013.01); *B60H 1/143* (2013.01)

(58) Field of Classification Search
CPC B60H 1/00385; B60H 1/00492; B60H 1/143; B60H 1/00278; B60H 1/00314; B60H 1/004; B60H 1/02; B60H 1/08; B60H 1/323; B60H 2001/00307; F28D 7/0008

USPC .................................................... 165/41, 200
See application file for complete search history.

(56) References Cited

U.S. PATENT DOCUMENTS

| 2005/0133215 A1* | 6/2005 | Ziehr | B60H 1/00392 165/202 |
|---|---|---|---|
| 2005/0167169 A1* | 8/2005 | Gering | B60H 1/00278 237/12.3 B |
| 2010/0012295 A1* | 1/2010 | Nemesh | B60H 1/00278 165/104.19 |

(Continued)

FOREIGN PATENT DOCUMENTS

| CN | 101400557 A | 4/2009 |
|---|---|---|
| CN | 101633306 A | 1/2010 |
| DE | 19730678 A1 | 1/1999 |

(Continued)

*Primary Examiner* — Travis Ruby
(74) *Attorney, Agent, or Firm* — Quinn IP Law

(57) ABSTRACT

A thermal management system having a first heating device, such as a rechargeable energy storage system (RESS), and a second heating device, such as an internal combustion engine (ICE), for a vehicle is provided. The system may allow waste heat within an ICE to be stored in a RESS, and may cool the RESS by depositing heat in the ICE. The RESS and the ICE are located in a first coolant circuit and a second coolant circuit, respectively. The system also includes a third coolant circuit interconnected with the first coolant circuit, and in thermal communication with the second coolant circuit via a first heat exchanger. The first and third coolant circuits are configured to circulate a first coolant, and the second coolant circuit is configured to circulate a second coolant. The RESS and the ICE are each configured to selectively operate as a heat source or a heat sink.

8 Claims, 4 Drawing Sheets

(56) References Cited

U.S. PATENT DOCUMENTS

2012/0297805 A1 11/2012 Kamada et al.

FOREIGN PATENT DOCUMENTS

| DE | 102009033959 A1 | 1/2010 |
|----|-----------------|--------|
| WO | 2012021104 A1 | 2/2012 |

* cited by examiner

MULTI-CIRCUITED VEHICULAR THERMAL MANAGEMENT SYSTEM AND METHOD

TECHNICAL FIELD

The present invention relates to a thermal management system for a vehicle, such as a hybrid electric vehicle (HEV) or a plug-in hybrid electric vehicle (PHEV), and a method of operating the thermal management system thereof.

BACKGROUND

An electric vehicle, such as a hybrid electric vehicle (HEV), a plug-in hybrid electric vehicle (PHEV), or the like, generally includes an electric motor, which may alone propel the vehicle in an electric vehicle (EV), or charge depleting, drive mode. The vehicle may also include an internal combustion engine (ICE) to serve as the primary, or range extending, propulsion system of the vehicle, or to operate in conjunction with the electric motor in a hybrid, or charge sustaining, mode.

The electric motor generally receives electric power from an electric power source, such as a rechargeable energy storage system (RESS). The RESS may include a battery pack or other rechargeable energy storage means capable of storing large amounts of energy. The energy stored in the RESS dissipates, and as such, the RESS needs to be recharged. This may be done when the vehicle is in an active drive state through regenerative braking, where the vehicle employs such a system. Alternatively, the charging may be accomplished when the vehicle is in an inactive charging state, in which the vehicle may be plugged into an electrical source, such as the electrical grid. In colder ambient temperatures, the charge depletes faster, due to various factors. As such, the distance the vehicle may travel in EV drive mode, or the EV range, is reduced in the colder ambient temperatures.

The RESS requires a thermal system for cooling and warming the battery pack to maximize the charging capacity and life of the battery pack. The thermal system generally includes a coolant line that runs through the RESS. Currently, the RESS may be heated using a high voltage heater on the coolant line. The RESS may be cooled with ambient air by running the coolant line through an ambient-to-liquid radiator. The RESS may also be cooled by exchanging heat in the coolant line with an air-conditioning (A/C) refrigeration loop by way of a chiller in parallel with a cabin evaporator.

SUMMARY

A thermal management system having a first thermal device and a second thermal device for a vehicle is provided. The first thermal device may be a rechargeable energy storage system (RESS) having at least one battery pack, and the second thermal device may be an internal combustion engine (ICE), both of which may be found in a vehicle, including, but not limited to, a hybrid electric vehicle (HEV), a plug-in hybrid electric vehicle (PHEV), or the like. The first thermal device is located in a first coolant circuit, and the second thermal device is located in a second coolant circuit.

The thermal management system also includes a third coolant circuit that is interconnected with the first coolant circuit, and that is in thermal communication with the second coolant circuit via a first heat exchanger. The first coolant circuit and the third coolant circuit are configured to circulate a first coolant, and the second coolant circuit is configured to circulate a second coolant. The first heat exchanger allows heat to be transferred between the first thermal device and the second thermal device via heat transfer between the first coolant and the second coolant.

The first thermal device and the second thermal device are each configured to selectively operate as a heat source or a heat sink. When the first thermal device operates as a heat source, such as when the vehicle is plugged in for charging or is in an electric vehicle (EV) drive mode, the second thermal device operates as a heat sink. As such, heat generated by the first thermal device may be transferred from the first thermal device to the second thermal device via heat transfer from the first coolant to the second coolant in the first heat exchanger.

Conversely, when the second thermal device operates as a heat source, such as when the vehicle is switched off from an active drive state, the first thermal device operates as a heat sink. As such, heat within the second thermal device may be transferred to the first thermal device via heat transfer from the second coolant to the first coolant in the first heat exchanger.

The thermal management system may further include a second heat exchanger and/or a heater located in the first coolant circuit. The second heat exchanger and the heater may be configured to cool and to heat, respectively, the first thermal device. The thermal management system may also include a heat scavenge valve configured to selectively direct at least a portion of the first coolant through at least one of the first coolant circuit and the third coolant circuit.

The thermal management system may further include a refrigeration circuit. The refrigeration circuit may be in thermal communication with the first coolant circuit via the second heat exchanger. The refrigeration circuit may further be in thermal communication with the second coolant circuit via a third heat exchanger.

A method of utilizing waste heat within a second thermal device of a vehicle also having a first thermal device is also provided. A method of cooling the first thermal device having generated heat in the vehicle is further provided. Both methods utilize the thermal management system described above.

The methods include circulating a first coolant through at least one of a first coolant circuit or a third coolant circuit, where the first thermal device is located in the first coolant circuit, and the third coolant circuit is interconnected with the first coolant circuit. The methods further include circulating a second coolant in a second coolant circuit, where the second thermal device is located in the second coolant circuit, and the second coolant circuit is in thermal communication with the third coolant circuit via a first heat exchanger.

In the method of utilizing the waste heat within the second thermal device, the second thermal device has an initial temperature higher than that of the thermal storage device. As such, the waste heat may be transferred to the first thermal device via heat transfer from the second coolant to the first coolant in the first heat exchanger.

In the method of cooling the first thermal device, the first thermal device has the higher initial temperature. As such, heat stored in the first thermal device may be transferred to the second thermal device via heat transfer from the first coolant to the second coolant in the first heat exchanger.

The above features and advantages, and other features and advantages, of the present invention are readily apparent from the following detailed description of some of the best modes and other embodiments for carrying out the inven-

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Figure 1A:
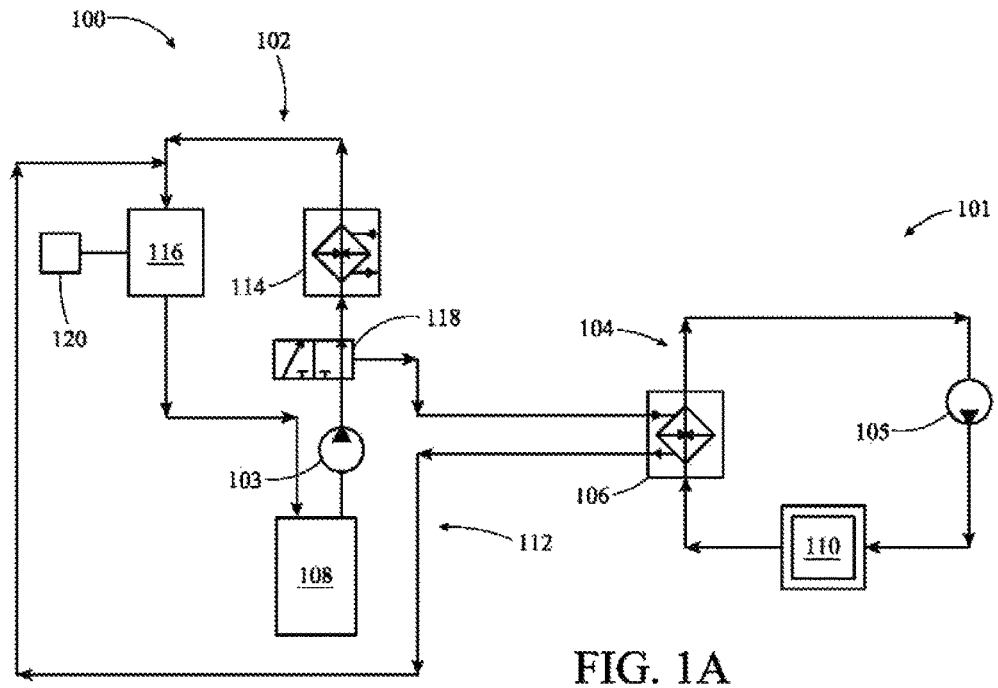
FIG. 1A is a schematic diagram of a thermal management system, having a first thermal device and a second thermal device, operating in a first mode in which the first thermal device operates as a heat sink, and the second thermal device operates as a heat source.
Figure 1B:
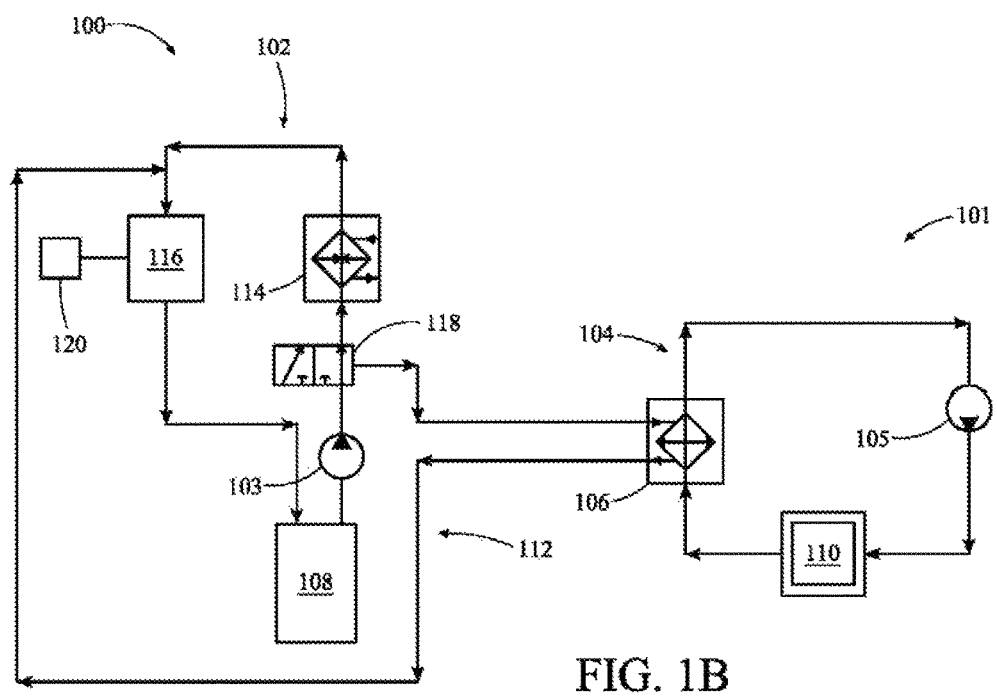
FIG. 1B is a schematic diagram of the thermal management system of FIG. 1A operating in a second mode in which the first thermal device operates as the heat source, and the second thermal device operates as the heat sink.

Referring to the drawings, wherein like reference numbers correspond to like or similar components wherever possible throughout the several figures, a thermal management system 100 for use in a vehicle 101 having an electric vehicle (EV) drive mode, in which the vehicle 101 operates solely on electricity, is shown in FIGS. 1A and 1B. The vehicle 101 may include but is not limited to, a hybrid electric vehicle (HEV), a plug-in hybrid electric vehicle (PHEV), or the like, is shown in FIGS. 1A and 1B. FIG. 1A depicts the thermal management system 100 operating in a first operating mode. FIG. 1B depicts the thermal management system 100 operating in a second operating mode. The first and second operating modes are described in more detail hereinafter.

Referring to FIGS. 1A and 1B, the thermal management system 100 generally includes a first coolant circuit 102, with a first coolant pump 103, configured to circulate a first coolant, and a second coolant circuit 104, with a second coolant pump 105, configured to circulate a second coolant. The thermal management system 100 also includes a third coolant circuit 112 also configured to circulate the first coolant. The third coolant circuit 112 is interconnected with the first coolant circuit 102, and is also in thermal communication with the second coolant circuit 104 via a first heat exchanger 106. The first heat exchanger 106 is configured to transfer heat between the first coolant and the second coolant, the direction of heat transfer being dependent upon the operating mode in which the thermal management system 100 is operating.

The thermal management system 100 further includes a first thermal device 108 located in the first coolant circuit 102, and a second thermal device 110 located in the second coolant circuit 104. Generally, the first thermal device 108 and the second thermal device 110 are any mediums, devices, machines, or the like, capable of both generating thermal energy and storing thermal energy. For example, the first thermal device 108 may be, but is not limited to, a rechargeable energy storage system (RESS) that includes at least one battery pack. The second thermal device 110 may be, but is not limited to, an internal combustion engine (ICE). A RESS and an ICE generally may be found in a vehicle having an EV drive mode, such as an HEV or a PHEV. For descriptive purposes only, the first thermal device 108 and the second thermal device 110 are referred to hereinafter as the RESS and the ICE, respectively.

The RESS 108 and the ICE 110 each may selectively operate as a heat source or a heat sink. Generally, in any mode of operation of the thermal management system 100, only one of the RESS 108 and the ICE 110 may operate as the heat source, while the other operates as the heat sink.

For example, in the first operating mode depicted in FIG. 1A, the RESS 108 operates as the heat sink, and the ICE 110 operates as the heat source. This may arise, for example, when the vehicle 101 is switched off from an active drive state, and will remain so for an extended period of time. Generally, internal heat within the ICE 110 from having been operated dissipates into the ambient air when the vehicle 101, and thus the ICE 110, is inactive for an extended period of time. Rather than letting it be wasted, the thermal management system 100 may utilize the waste heat from the ICE 110 by transferring it to the RESS 108 to be stored. The waste heat is absorbed by the second coolant, which in turn transfers it to the first coolant via the first heat exchanger 106. The waste heat, now in the third circuit 112, may be transferred to and stored in the RESS 108 as the first coolant flows through it.

Conversely, in a second operating mode, as depicted in FIG. 1B, the RESS 108 operates as the heat source, and the ICE 110 operates as the heat sink. This may arise, for example, when the RESS 108 may need to be cooled, such as when the vehicle 101 is plugged in to a power source for charging, or the vehicle 101 is in EV drive mode, and the ICE 110 has not been in operation such that it is at a cooler temperature. In a similar manner to the heat transfer in the first operation mode, the heat from the RESS 108 is absorbed by the first coolant, which in turn transfers it to the second coolant via the first heat exchanger 106. The second coolant may then deposit the heat into the ICE 110 as the second coolant flows through it.

Figure 2A:
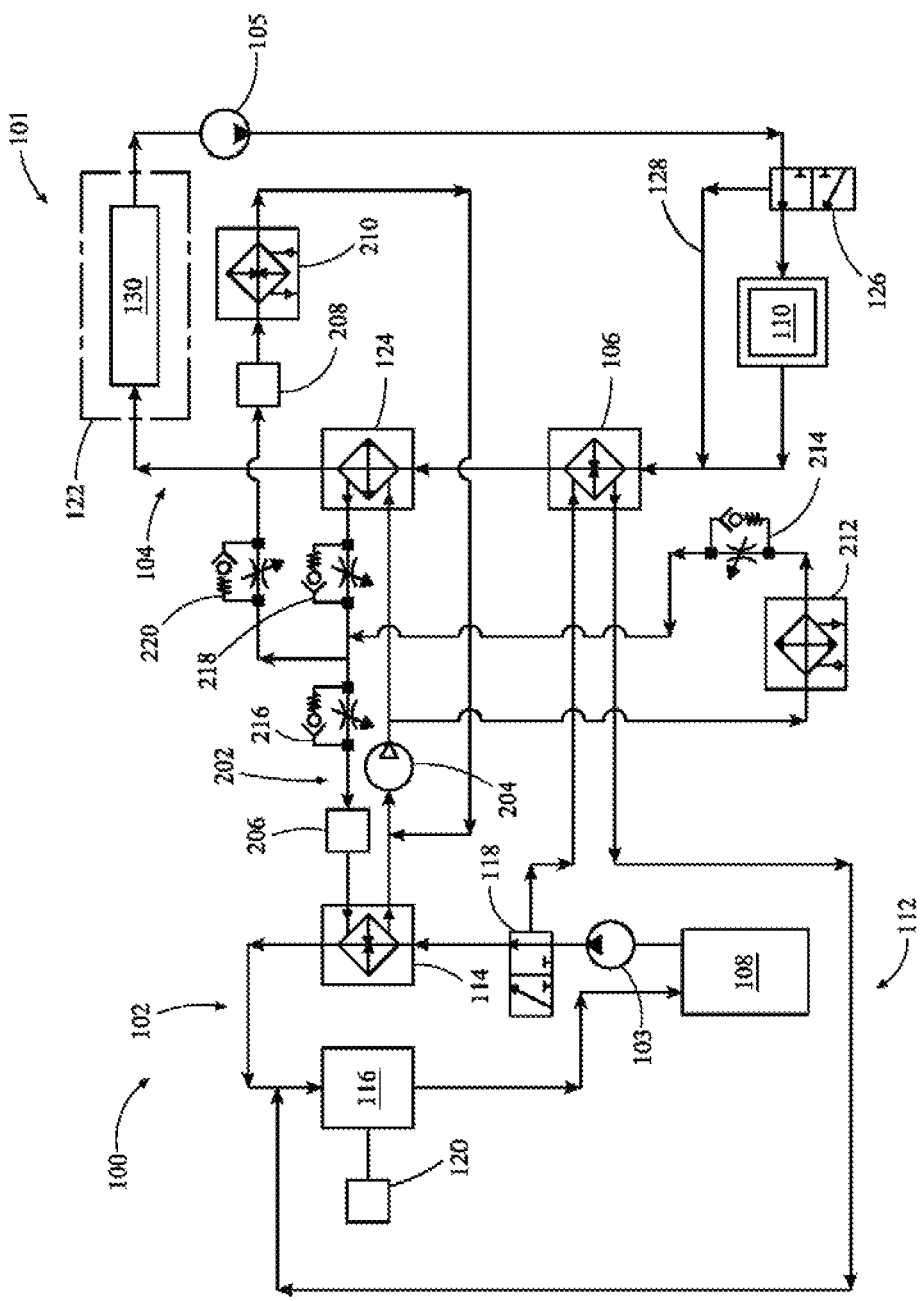
FIG. 2A is a schematic diagram of the thermal management system of FIG. 1A, including a heat pump system, operating in the first mode.
Figure 2B:
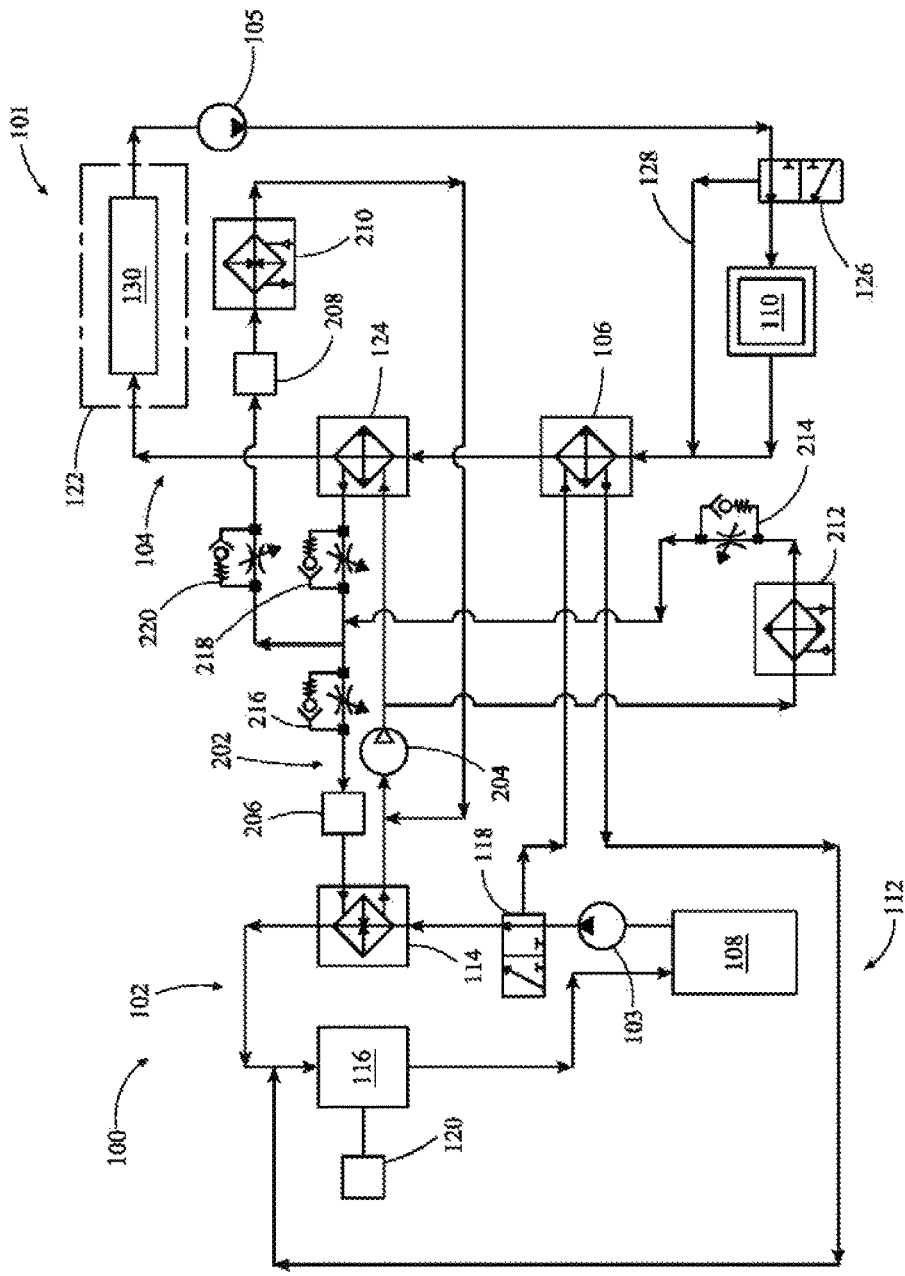
FIG. 2B is a schematic diagram of the thermal management system of FIG. 2A operating in the second mode.

The thermal management system 100 further may include a second heat exchanger 114 and/or a heater 116 located in the first coolant circuit 102. The second heat exchanger 114 may be used to cool the RESS 108 in situations in which the ICE 110 is unable to absorb enough heat to adequately cool the RESS 108. The second heat exchanger 114 may be a refrigerant-to-liquid heat exchanger to transfer heat from the RESS 108 via the first coolant to a refrigerant, as depicted in FIGS. 2A and 2B and described in more detail hereinafter. Similarly, the heater 116 may be used to heat the RESS 108 in situations in which the ICE 110 has not generated an adequate amount of waste heat to be stored in the RESS 108. The heater 116 may be a resistive heater.

The thermal management system 100 may further include a heat scavenge valve 118 configured to selectively direct the flow of the first coolant to flow to the first heat exchanger 106 through the third coolant circuit 112, and/or to the second heat exchanger 114 through the first coolant circuit 102. While the heat scavenge valve 118 is shown in the figures as a two-position three-way valve, it should be appreciated that it may be any three-way valve configured to selectively direct the flow to the first heat exchanger 106 and/or to the second heat exchanger 114. In an alternative embodiment not shown, in lieu of a three-way valve, the thermal management system 100 may include two separate flow control valves, one each on the first coolant circuit and the third coolant circuit. In another embodiment not shown, the heat scavenge valve 118 may be a four-way valve configured to bypass the second heat exchanger 114.

The thermal management system 100 may also include at least one controller 120 configured to control the operation of the thermal management system 100. In particular, the controller 120 may control the operation of the heat scavenge valve 118 to selectively direct the flow of the first coolant to the first heat exchanger 106 or to the second heat exchanger 114. The operation of the thermal system 100 may be dependent upon certain conditions, including, but not limited to, the outdoor air temperature, the humidity, the time of day, the length of time the vehicle 101 is to remain in the inactive charging state, and the like. The controller 120 may be configured to process these conditions to determine whether the thermal management system 100 should operate in the first operating mode or the second operating mode, or operate at all.

The thermal management system 100 may be integrated with a heat pump system 200, as depicted in FIGS. 2A and 2B. This may allow heat stored in the RESS 108 to be transferred to a passenger compartment 122 of the vehicle 101. FIG. 2A illustrates the thermal management system 100 in the first operating mode, as described above, and FIG. 2B illustrates the thermal management system 100 in the second operating mode, also as described above.

Referring now to FIGS. 2A and 2B, the heat pump system 200 may include a refrigerant circuit 202 configured to circulate a refrigerant. The refrigeration circuit 202 is in thermal communication with the first coolant circuit 102 via the second heat exchanger 114. As explained above, the second heat exchanger 114 may be a refrigerant-to-liquid heat exchanger, such as an RESS chiller, that may function as a heat pump evaporator to dissipate heat from the first coolant to the refrigerant. The refrigerant circuit 202 is further in thermal communication with the second coolant circuit 104 via a third heat exchanger 124. The third heat exchanger similarly may be a liquid-to-liquid heat exchanger that may function as a heat pump condenser for the heat pump system 200.

The refrigerant circuit 202 may include a compressor 204 located downstream of the second heat exchanger 114 and upstream of the third heat exchanger 124. The compressor 110 is configured to compress the refrigerant.

The refrigerant circuit 202 may further include a first thermal expansion device 206, a second thermal expansion device 208, a fourth heat exchanger 210, a fifth heat exchanger 212, and flow control valves 214, 216, 218, and 220. The first thermal expansion device 206 and the second thermal expansion device 208 are located downstream of the third heat exchanger 124, and are configured to cool and expand the refrigerant, and to distribute the refrigerant to the second heat exchanger 114 and to the fourth heat exchanger 210, respectively. The first thermal expansion device 206 and the second thermal expansion device 208 may be thermostatic or thermal expansion valves, and may be either electronically or mechanically actuated.

The fourth heat exchanger 210 may function as a cabin evaporator. It may be configured to exchange heat from the refrigerant flowing through it to air flowing across it and into the passenger compartment 122 to cool and dehumidify the passenger compartment 122. The fifth heat exchanger 212 may be a refrigerant-to-air condenser. The fifth heat exchanger 212 may be configured to receive pressurized refrigerant gas from the compressor 204 and to condense the pressurized refrigerant gas into a liquid state as it flows through the fifth heat exchanger 212. The fifth heat exchanger 212 further may be configured to expel the refrigerant to at least one of the first thermal expansion device 206 and the second thermal expansion deice 208.

The flow control valves 214, 216, 218, and 220 may be configured to control the flow to the various components in the refrigeration circuit 202. It should be appreciated that the flow control valves 214, 216, 218, and 220 may be any valve capable of restricting the flow of refrigerant in a particular line. The flow control valves 214, 216, 218, and 220 may be, but are not limited to, two-position, open/closed valves, or alternatively, modulating valves.

The second coolant circuit 104 may include a bypass valve 126 and a bypass line 128. The bypass valve 126 is configured to selectively direct the second coolant to the ICE 110 to cool it when the vehicle 101 is in hybrid mode, or to the bypass line 128 when the vehicle 101 is in EV drive mode. Similar to the heat scavenge valve 118, the bypass valve 126 may be a two-position three-way valve. It should be appreciated that the bypass valve 126 may be any three-way valve configured to selectively direct the flow to the ICE 110 and/or to the bypass line 128. In an alternative embodiment not shown, in lieu of a three-way valve, the thermal management system 100 may include two separate flow control valves, one each on the bypass line 128 and the second coolant circuit 104 downstream of the takeoff for the bypass line 128.

The second coolant circuit 104 may further include a coolant heater core 130. The coolant heater core 130 may be configured to receive the second coolant to heat air that was dehumidified by the fourth heat exchanger 210, thereby effectively transferring heat stored in the RESS 108 to the passenger compartment 122.

Figure 3:
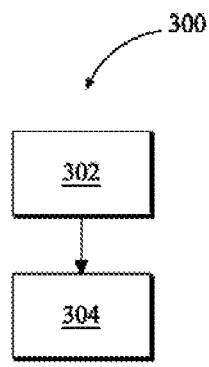
FIGS. 3 and 4 are schematic flow diagrams illustrating an exemplary method of operating the thermal management system of FIGS. 1A-2B.
Figure 4:
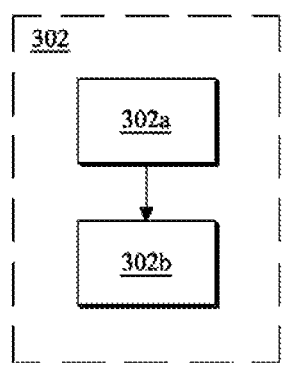

Referring now to FIGS. 3 and 4, a method 300 of operating the thermal management system 100 in either the first operating mode or the second operating mode is shown.

Method 300 begins with step 302, in which the first coolant is circulated through the first coolant circuit 102. In embodiments in which the thermal management system 100 includes a third coolant circuit 112 and a heat scavenge valve 118, step 302 may first involve a sub-step 302a, as depicted in FIG. 4. At sub-step 302a, at least a portion of the flow of the first coolant is directed to the first coolant circuit 102 via the heat scavenge valve 118. The first coolant then may be circulated through the first coolant circuit 102 at step 302b.

After step 302, method 300 proceeds to step 304. At step 304, the second coolant is circulated through the second coolant circuit 104. Heat may then be transferred between the first coolant and the second coolant via the first heat exchanger 106.

As explained above, in the first operating mode, the ICE 110 has a higher initial temperature than the RESS 108 due to waste heat generated by the ICE 110. As such, method 300 allows for the waste heat to be utilized by storing it in the RESS 108. Conversely, in the second operating mode, the RESS 108 has a higher initial temperature than the ICE 110. As such, method 300 allows for the RESS 108 to be cooled by transferring heat to the ICE 110.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A thermal management system for a vehicle, the system comprising:
   a first coolant circuit configured to circulate a first coolant;
   a second coolant circuit configured to circulate a second coolant a third coolant circuit interconnected with the first coolant circuit, the third coolant circuit being configured to circulate the first coolant, and being in thermal communication with the second coolant circuit via a first heat exchanger;
   a first thermal device located in the first coolant circuit;
   a second thermal device located in the second coolant circuit;
   a heater located in the first coolant circuit, wherein the heater is configured to heat the first thermal device;
   a heat scavenge valve that is a two-position three-way valve configured to selectively direct at least a portion of the first coolant through at least one of the first coolant circuit and the third coolant circuit; and
   wherein the first thermal device and the second thermal device are each configured to selectively operate as a heat source or a heat sink.

2. The system of claim 1 wherein the first thermal device is a rechargeable energy storage system (RESS) having at least one battery pack.

3. The system of claim 1 wherein the second thermal device is an internal combustion engine (ICE).

4. The system of claim 1 wherein the first thermal device operates as a heat sink, and the second thermal device operates as a heat source, where heat generated from the second thermal device is transferable to the first thermal device via heat transfer from the second coolant to the first coolant in the first heat exchanger.

5. The system of claim 1 wherein the first thermal device operates as a heat source, and the second thermal device operates as a heat sink, where heat stored in the first thermal device is transferable to the second thermal device via heat transfer from the first coolant to the second coolant in the first exchanger.

6. The system of claim 1 wherein the heater is a resistive heater.

7. The system of claim 1 further comprising a second heat exchanger located in the first coolant circuit, the second heat exchanger being configured to cool the first thermal device.

8. The system of claim 7 further comprising a refrigeration circuit configured to circulate a refrigerant, the refrigeration circuit being in thermal communication with the first coolant circuit via the second heat exchanger, and with the second coolant circuit via a third heat exchanger.

* * * * *